(12) United States Patent
Kawai et al.

(10) Patent No.: US 12,606,088 B2
(45) Date of Patent: Apr. 21, 2026

(54) INDICATOR AND OUTER MIRROR

(71) Applicants:TOYOTA JIDOSHA KABUSHIKI KAISHA, Aichi-ken (JP); Murakami Corporation, Shizuoka (JP)

(72) Inventors: Tasuku Kawai, Miyoshi (JP); Hiroshi Kawai, Nissin (JP); Manabu Fukuhara, Shizuoka (JP); Hiroya Miwa, Shizuoka-ken (JP)

(73) Assignees: TOYOTA JIDOSHA KABUSHIKI KAISHA, Aichi-Ken (JP); Murakami Corporation, Shizuoka (JP)

( * ) Notice: Subject to any disclaimer, the term of this patent is extended or adjusted under 35 U.S.C. 154(b) by 0 days.

(21) Appl. No.: 19/087,586

(22) Filed: Mar. 24, 2025

(65) Prior Publication Data

US 2025/0303964 A1     Oct. 2, 2025

(30) Foreign Application Priority Data

Mar. 29, 2024    (JP) ................................. 2024-057834

(51) Int. Cl.
| | |
|---|---|
| B60R 1/12 | (2006.01) |
| B60Q 1/32 | (2006.01) |
| B60R 1/00 | (2022.01) |
| F21S 43/20 | (2018.01) |
| F21W 103/10 | (2018.01) |
| F21Y 115/10 | (2016.01) |

(52) U.S. Cl.
CPC .............. *B60R 1/1207* (2013.01); *B60Q 1/32* (2013.01); *B60R 1/006* (2013.01); *F21S*

*43/26211* (2024.05); *F21S 43/265* (2024.05); *F21W 2103/10* (2018.01); *F21Y 2115/10* (2016.08)

(58) Field of Classification Search
CPC ...................................................... F21S 43/265
See application file for complete search history.

(56) References Cited

U.S. PATENT DOCUMENTS

| | | | | |
|---|---|---|---|---|
| 7,771,062 | B2 * | 8/2010 | Kuhn ................... | B60Q 1/2665 |
| | | | | 362/494 |
| 8,058,977 | B2 * | 11/2011 | Lynam ..................... | B60R 1/08 |
| | | | | 340/463 |
| 8,242,896 | B2 | 8/2012 | Lynam | |
| 2019/0366923 | A1 * | 12/2019 | Chen ........................ | B60R 1/06 |
| 2021/0213874 | A1 * | 7/2021 | Chang ................. | B60Q 1/2665 |

FOREIGN PATENT DOCUMENTS

JP          2017-218113  A     12/2017

* cited by examiner

*Primary Examiner* — Eric T Eide
(74) *Attorney, Agent, or Firm* — HAUPTMAN HAM, LLP

(57)          ABSTRACT
An indicator provided on an outer mirror of a vehicle includes: a light transmission portion formed in a mirror surface portion of a mirror member of the outer mirror; and a light emission portion disposed on a side opposite to an exposure surface side being exposed to the outside of the mirror member in such a way that the light emission portion can emit light through the light transmission portion. The light transmission portion includes a plurality of linear transmission portions each extending in a horizontal direction and also being aligned in a vertical direction.

17 Claims, 11 Drawing Sheets

FIG. 8

FRONT

LEFT ← → RIGHT

REAR

FIG. 10

FRONT

LEFT ←——→ RIGHT

REAR

INDICATOR AND OUTER MIRROR

RELATED APPLICATIONS

The present application claims priority of Japanese Patent Application No. 2024-057834 filed Mar. 29, 2024, the disclosure of which is hereby incorporated by reference herein in its entirety.

FIELD

The present disclosure relates to an indicator and an outer mirror.

BACKGROUND

An outer mirror including an indicator that emits light has been conventionally known (JP 2017-218113 A, U.S. Pat. No. 8,242,896 B). Particularly, an indicator of a door mirror described in JP 2017-218113 A includes an outer mark having a triangular annular shape and an inner mark having a triangular shape, and the outer mark is disposed in such a way as to surround an entire circumference of the inner mark. In the door mirror described in JP 2017-218113 A, a reflective film is not provided in positions of the outer mark and the inner mark, and light is thus transmitted through the inside and the outside of the door mirror in the positions.

In the door mirror described in JP 2017-218113 A, the reflective film is not provided in a region where the outer mark and the inner mark are located. Therefore, even when an object such as another vehicle is located in a position corresponding to the region, there is a possibility that a driver cannot necessarily appropriately visually recognize the object.

SUMMARY

In view of the problem described above, an objective of the present disclosure is to increase visibility of an object in an outer mirror.

The gist of the present disclosure is as follows.

(1) An indicator provided on an outer mirror of a vehicle, the indicator comprising:
a light transmission portion formed in a mirror surface portion of a mirror member of the outer mirror; and
a light emission portion disposed on a side opposite to an exposure surface side being exposed to the outside of the mirror member in such a way that the light emission portion can emit light through the light transmission portion, wherein
the light transmission portion includes a plurality of linear transmission portions each extending in a horizontal direction and also being aligned in a vertical direction.
(2) The indicator according to above (1), wherein
the light transmission portion is formed in such a way that the plurality of linear transmission portions as a whole form one closed planar figure.
(3) The indicator according to above (2), wherein
the light transmission portion is formed in such a way that the plurality of linear transmission portions as a whole form one triangle.
(4) The indicator according to above (3), wherein
the light transmission portion is formed in such a way that the plurality of linear transmission portions as a whole form one triangle having a base extending horizontally.

(5) The indicator according to any one of above (1) to (4), wherein
the light transmission portion is formed of only the plurality of linear transmission portions.
(6) The indicator according to any one of above (1) to (5), wherein
the light emission portion includes a light emission body, and a lens disposed between the light emission body and the light transmission portion.
(7) The indicator according to above (6), further comprising
a housing disposed around the light emission portion, wherein
an inner surface of the housing is formed in a mirror surface manner.
(8) An outer mirror comprising the indicator according to any one of above (1) to (7), wherein
the light transmission portion is formed in the mirror surface portion closer to the outside with respect to the center in a vehicle width direction of the mirror member.

BRIEF DESCRIPTION OF DRAWINGS

FIG. 8 is a cross-sectional view of the indicator viewed along a line IIX-IIX in FIG. 7.

FIG. 10 is a cross-sectional view of the indicator similar to FIG. 8, being viewed along a line X-X in FIG. 4.

DESCRIPTION OF EMBODIMENTS

Hereinafter, example embodiments will be described in detail with reference to the drawings. Note that, in the following description, the same reference sign is provided to a similar component.

<Configuration of Vehicle and Door Mirror>

Figure 1:
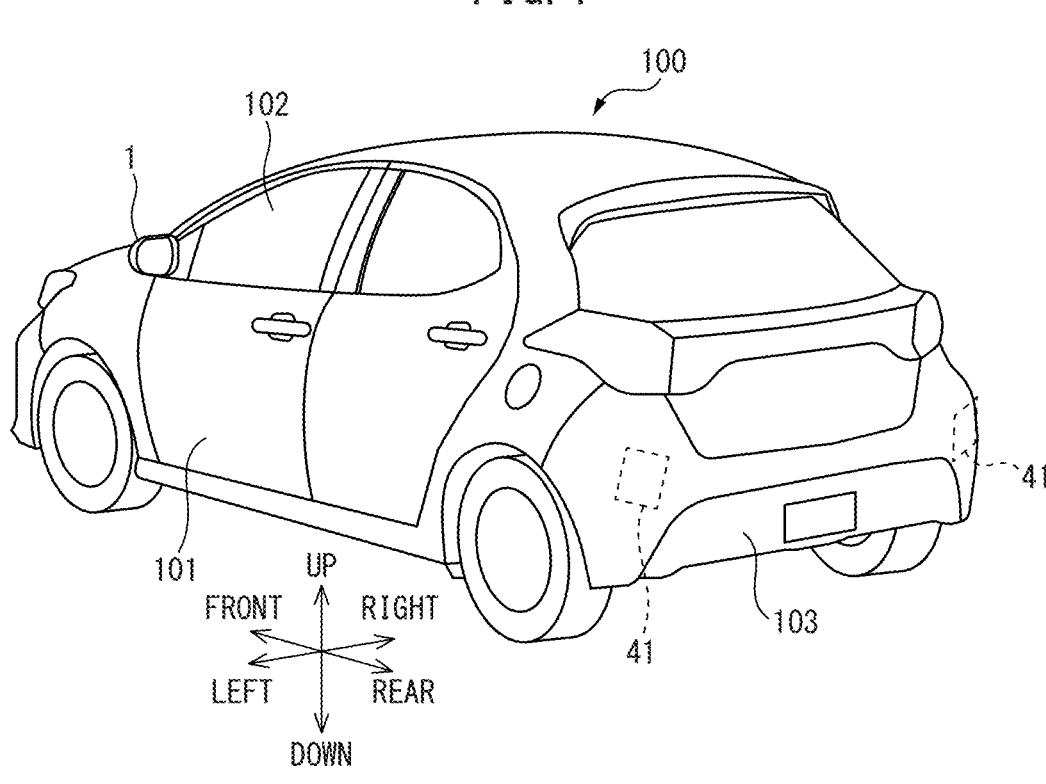
FIG. 1 is a perspective view schematically illustrating a vehicle including a door mirror.

First, a configuration of a vehicle 100 including a door mirror 1 having an indicator 30 according to one embodiment will be described with reference to FIGS. 1 to 3. The indicator 30 is an indicating light that is lit when an object such as another vehicle is present in the left rear or the right rear of the vehicle 100. FIG. 1 is a perspective view schematically illustrating the vehicle 100 including the door mirror 1.

Note that, in the present specification, a forward direction and a backward direction of the vehicle 100 will be described as the front and the rear, respectively. A ceiling side of the vehicle 100 will be described as the top, and a floor side will be described as the bottom. A direction perpendicular to a road surface of a road on which the vehicle 100 is located will be described as a vertical direction, and a direction parallel to the road surface will be described as a horizontal direction. Furthermore, a left side when facing in a traveling direction of the vehicle 100 will be described as the left, and a right side when facing in the traveling direction of the vehicle 100 will be described as the right.

As illustrated in FIG. 1, the vehicle 100 includes the door mirror 1 attached to a front portion of a door 101 of the vehicle 100. The door mirror 1 is disposed at a height at which a window glass 102 of the door 101 is located, particularly at a height corresponding to a lower portion of the window glass 102. The door mirror 1 is used by a passenger (particularly, a driver) of the vehicle 100 to visually recognize a rear lateral side of the vehicle 100. FIG. 1 illustrates only the door mirror 1 on a left side of the vehicle 100, but a door mirror is also provided on a right side of the vehicle 100.

Note that, in the present embodiment, the vehicle 100 includes the door mirror 1 as an outer mirror (a wing mirror or a side mirror) disposed outside a room of the vehicle 100. However, the vehicle 100 may include a fender mirror attached to a fender of the vehicle 100 instead of the door mirror 1. In this case, the indicator 30 described below is provided on the fender mirror.

Figure 2:
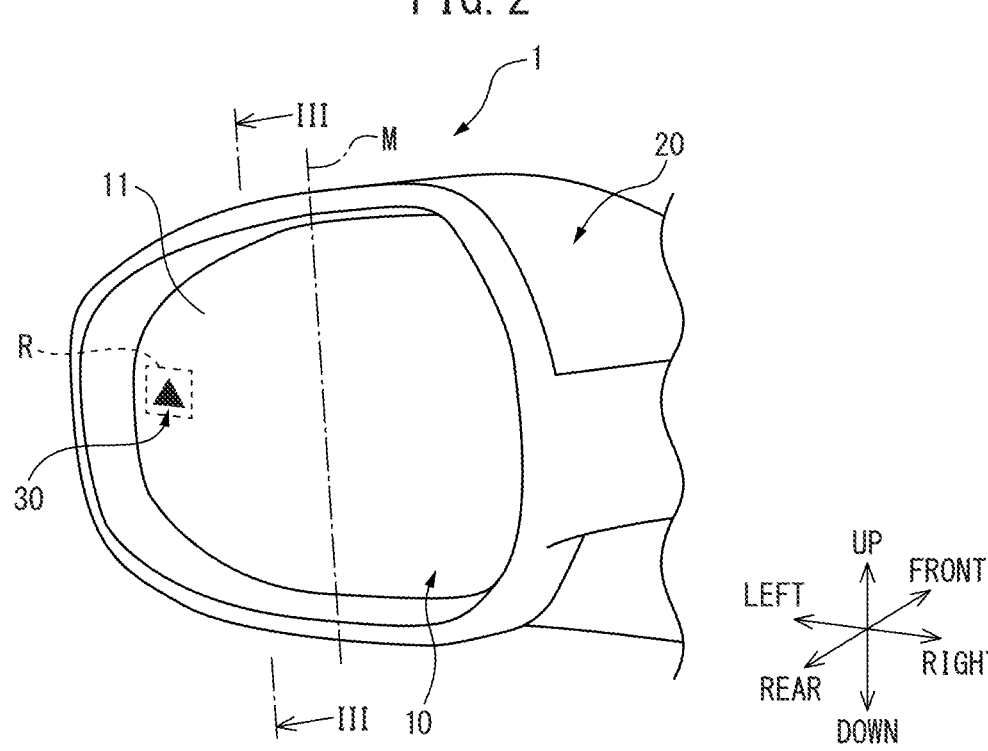
FIG. 2 is a perspective view schematically illustrating the door mirror.

FIG. 2 is a perspective view schematically illustrating the door mirror 1. Particularly, FIG. 2 is a perspective view when the door mirror 1 is viewed from the inside of the vehicle 100 (from a position of a driver). As illustrated in FIG. 2, the door mirror 1 includes a mirror member 10, and a mirror body 20 surrounding the mirror member 10.

The mirror member 10 is a member functioning as a reflecting mirror. The mirror member 10 includes an exposure surface 11 on one of the surfaces of the mirror member 10. The mirror member 10 is disposed in the mirror body 20 in such a way that the exposure surface 11 is exposed from the mirror body 20 to the outside. Therefore, a surface of the mirror member 10 on a side opposite to the exposure surface 11 is surrounded by the mirror body 20 and cannot be visually recognized from the outside.

Figure 3:
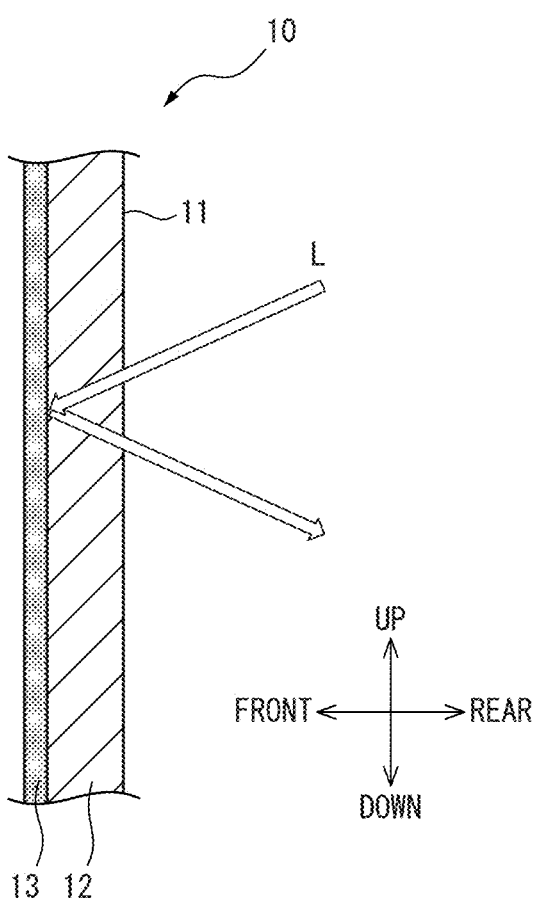
FIG. 3 is a cross-sectional view of a mirror member taken along a plane III-III in FIG. 2.

FIG. 3 is a cross-sectional view of the mirror member 10 taken along a plane III-III in FIG. 2. As illustrated in FIG. 3, the mirror member 10 includes a glass portion 12 and a mirror surface portion 13. The glass portion 12 is a transparent member made of glass, and is formed in a flat plate shape. The mirror surface portion 13 is a member formed of a glossy material such as chrome, aluminum, silver, or the like, and reflects light. The mirror surface portion 13 is bonded onto a surface (hereinafter, also referred to as a "rear surface") of the glass portion 12 on a side opposite to the exposure surface 11 side (i.e., of the glass portion 12 on an inner side of the mirror body 20). In the mirror member 10 configured in such a manner, light L entering the glass portion 12 from the exposure surface 11 side is reflected by a surface (hereinafter also referred to as a "front surface") of the mirror surface portion 13 on the exposure surface 11 side, passes through the glass portion 12 again, and is radiated.

Note that, in the present embodiment, the mirror member 10 is formed in such a way that the glass portion 12 and the mirror surface portion 13 overlap each other in layers. However, the mirror member 10 may include another layer (for example, a metal layer or the like disposed on a surface (hereinafter, also referred to as a "rear surface") of the mirror surface portion 13 on a side opposite to the glass portion 12 side) in addition to the glass portion 12 and the mirror surface portion 13.

Further, as illustrated in FIG. 2, the mirror member 10 is provided with the indicator 30 that is lit when an object is present in a rear lateral side of the vehicle 100. In the present embodiment, a light transmission portion 36 (see FIG. 4) of the indicator 30 is formed in the mirror surface portion 13 closer to the outside with respect to the center M in a left-right direction (vehicle width direction) of the mirror member 10. Particularly, in the present embodiment, the light transmission portion 36 of the indicator 30 is disposed substantially at the center of the mirror member 10 in an up-down direction. In addition, the light transmission portion 36 of the indicator 30 is disposed close to an outer portion of the mirror body 20 in the left-right direction.

<Configuration of Indicator>

Figure 4:
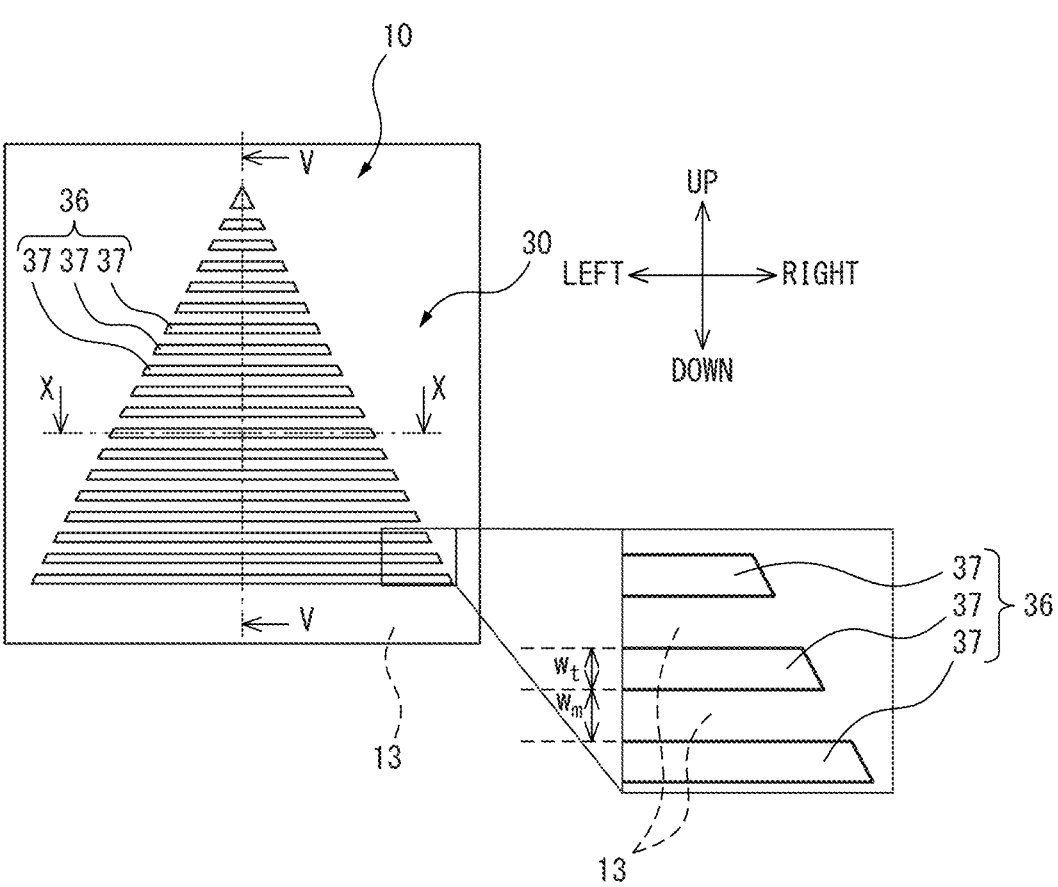
FIG. 4 is a diagram illustrating an enlarged region R in FIG. 2.
Figure 5:
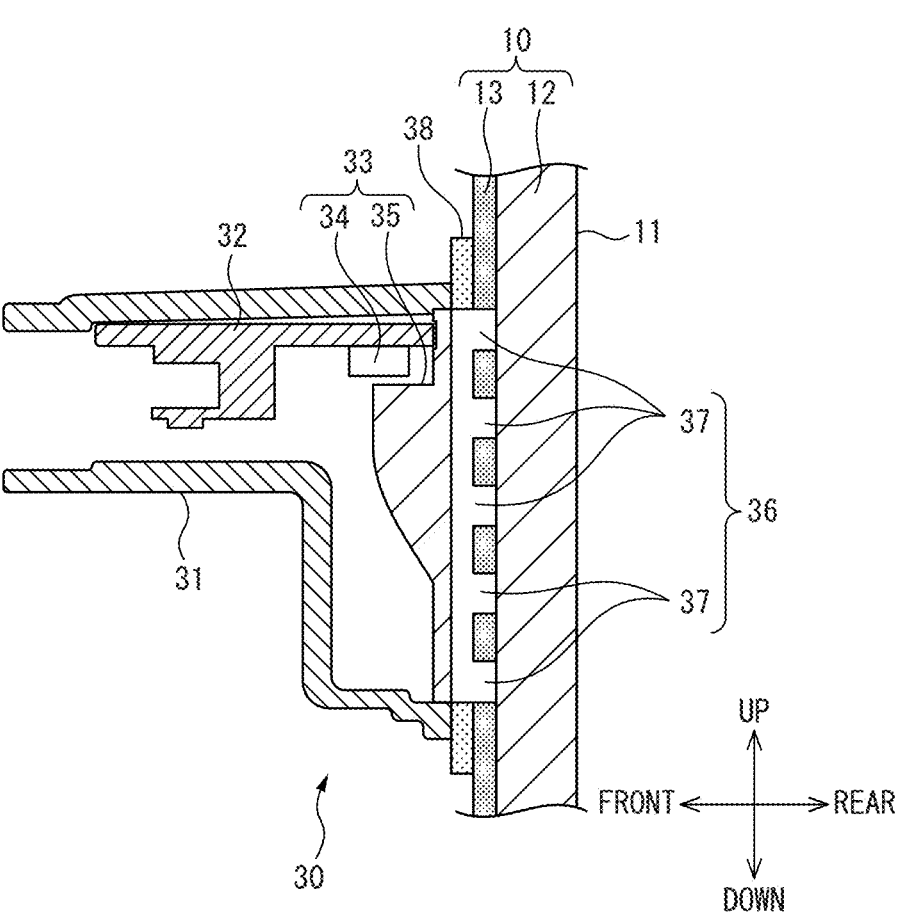
FIG. 5 is a cross-sectional view of an indicator viewed along a line V-V in FIG. 4.

Next, a configuration of the indicator 30 of the mirror member 10 of the door mirror 1 will be described with reference to FIGS. 4 and 5. FIG. 4 is a diagram illustrating an enlarged region R of the light transmission portion 36 in FIG. 2. Particularly, FIG. 4 includes a diagram illustrating an enlarged lower right portion of the indicator 30. FIG. 5 is a cross-sectional view of the indicator 30 viewed along a line V-V in FIG. 4. As illustrated in FIG. 5, the indicator 30 includes a housing 31, a printed board 32, a light emission portion 33, and the light transmission portion 36.

The housing 31 houses a part of parts constituting the indicator 30. As illustrated in FIG. 5, the housing 31 is attached to a surface of the mirror member 10 on a side (hereinafter, also referred to as a "rear side") opposite to the exposure surface 11 via a bonding member 38. In the present embodiment, the housing 31 is attached to the rear surface of the mirror surface portion 13 of the mirror member 10 via the bonding member 38.

As illustrated in FIG. 5, the housing 31 is configured to open to at least the mirror member 10 side. Therefore, a part disposed in the housing 31, particularly at least a part of a lens 35 faces the rear surface of the mirror surface portion 13 without being blocked by the housing 31. In addition, in the present embodiment, as illustrated in FIG. 5, the housing 31 is configured to partially open on a side opposite to the mirror member 10 side. However, the housing 31 may be configured to be entirely closed on the side opposite to the mirror member 10 side. In the present embodiment, an inner surface of the housing 31 is formed in a mirror surface manner in such a way that light emitted from the light emission portion 33 is not absorbed by the inner surface of the housing 31.

The printed board 32 is a board on which electronic parts related to the indicator 30 are mounted. In the present embodiment, the light emission portion 33, and a communication interface part for connecting the indicator 30 to an apparatus outside the indicator 30 (an electronic control unit (ECU) 50 described below in the present embodiment) are mounted on the printed board 32.

As illustrated in FIG. 5, the printed board 32 is housed in the housing 31. In the present embodiment, the printed board 32 is fixed to the housing 31, and is also disposed in such a way as to extend perpendicularly to the mirror member 10.

The light emission portion 33 is a portion that emits light so as to light the indicator 30. In the present embodiment, the light emission portion 33 includes a light emission body 34 being an apparatus that emits light, and the lens 35 disposed between the light emission body 34 and the light transmission portion 36. The light emission portion 33 is disposed close to the light transmission portion 36 in such a way that the light emission portion 33 can emit light to the outside of the mirror member 10 through the light transmission portion 36 of the mirror member 10. Particularly, in the present embodiment, the light emission portion 33 is disposed directly on a rear side of the light transmission portion 36 of the mirror member 10. The light emission portion 33 is housed in the housing 31. Therefore, the housing 31 is disposed around the light emission portion 33.

In the present embodiment, the light emission body 34 is one LED. The light emission body 34 is housed in the housing 31, and is also attached to the printed board 32. Therefore, the light emission body 34 is disposed on the rear side of the mirror member 10 (on the side opposite to the exposure surface 11 side). In the present embodiment, the light emission body 34 is disposed on a surface of the printed board 32 on a side facing the lens 35. As a result, the light emission body 34 is disposed between the printed board 32 and the lens 35. The light emission body 34 is supplied with power via a wiring line on the printed board 32, and emits light according to the power supply. Note that any apparatus may be used for the light emission body 34 as long as the apparatus can emit light, such as an electric bulb. Further, the light emission body 34 may be formed of a plurality of apparatuses such as a plurality of LEDs.

In the present embodiment, the lens 35 guides, to the light transmission portion 36, light emitted from the light emission body 34. In other words, the lens 35 guides light emitted from the light emission body 34 in such a way that the light is emitted to the outside of the mirror member 10 through the light transmission portion 36. Particularly, in the present embodiment, the lens 35 guides light emitted from the light emission body 34 in many directions so as to become light having a shape matching an overall shape of the light transmission portion 36. As a result, even when one LED is used as the light emission body 34, the light emission portion 33 can emit light having sufficient brightness, for example, brightness of about 3000 to 5000 cd/m² when viewed from a driver's seat. Further, in the present embodiment, the lens 35 is configured to emit light having a shape matching an overall shape of the light transmission portion 36 and having substantially equal intensity when light emitted from the light emission body 34 is incident. As a result, the indicator 30 can emit light without unevenness.

The light transmission portion 36 is a portion that is provided on the mirror member 10 and transmits light. Therefore, the light transmission portion 36 transmits light on the rear side of the mirror member 10, particularly light from the light emission portion 33 to the exposure surface 11 side. As illustrated in FIG. 5, the mirror surface portion 13 is not provided in the light transmission portion 36. Therefore, light is transmitted through the light transmission portion 36 due to the mirror surface portion 13 not being provided in such a manner. In addition, since the mirror surface portion 13 is not provided in the light transmission portion 36, light entering the glass portion 12 from the exposure surface 11 is not reflected on the rear side of the glass portion 12. Meanwhile, the mirror surface portion 13 is provided in the mirror member 10 in a region other than the light transmission portion 36. Therefore, the mirror member 10 does not transmit light in the region other than the light transmission portion 36. Then, as described above, light entering the glass portion 12 from the exposure surface 11 side is reflected by the front surface of the mirror surface portion 13 in the region other than the light transmission portion 36.

As illustrated in FIG. 4, the light transmission portion 36 includes a plurality of linear transmission portions 37. The linear transmission portions 37 each extend in the horizontal direction, and the plurality of linear transmission portions 37 are also aligned in the vertical direction. Particularly, in the present embodiment, the light transmission portion 36 is formed of only the linear transmission portions 37. Therefore, the light transmission portion 36 does not include, for example, a transmission portion extending in the vertical direction and a direction at an angle with respect to the horizontal direction.

Further, in the present embodiment, the linear transmission portions 37 are formed in such a way as to all have the same width (length in the up-down direction) Wt. In addition, in the present embodiment, the light transmission portions 37 are formed in such a way as to all have the same interval Wm between the linear transmission portions 37. Furthermore, in the present embodiment, five or more, ten or more, or 15 or more linear transmission portions 37 are aligned in the vertical direction in the light transmission portion 36. Further, in the present embodiment, 30 or less, 25 or less, or 20 or less linear transmission portions 37 are aligned in the vertical direction in the light transmission portion 36.

As illustrated in FIG. 4, the light transmission portion 36 is formed in such a way that the plurality of linear transmission portions 37 as a whole form one triangle. A length of one side of the triangle at this time is 5 mm or more, 8 mm or more, or 11 mm or more. Further, a length of one side of the triangle is 30 mm or less, 22 mm or less, or 15 mm or less.

In the present embodiment, the light transmission portion 36 is formed in such a way that the plurality of linear transmission portions 37 as a whole form a triangle having a base extending horizontally. Therefore, the light transmission portion 36 is formed in such a way that a length in the vehicle width direction (left-right direction) of the linear transmission portion 37 increases from the top toward the bottom. In the present embodiment, the light transmission portion 36 is formed in such a way that the plurality of linear transmission portions 37 as a whole form an isosceles triangle having equal sides other than the base. For example, the light transmission portion 36 is formed in such a way that the plurality of linear transmission portions 37 as a whole form an equilateral triangle having the base extending horizontally. The light transmission portion 36 has such a shape, and thus a passenger can intuitively recognize presence of another vehicle traveling forward in the rear lateral side.

Figure 6:
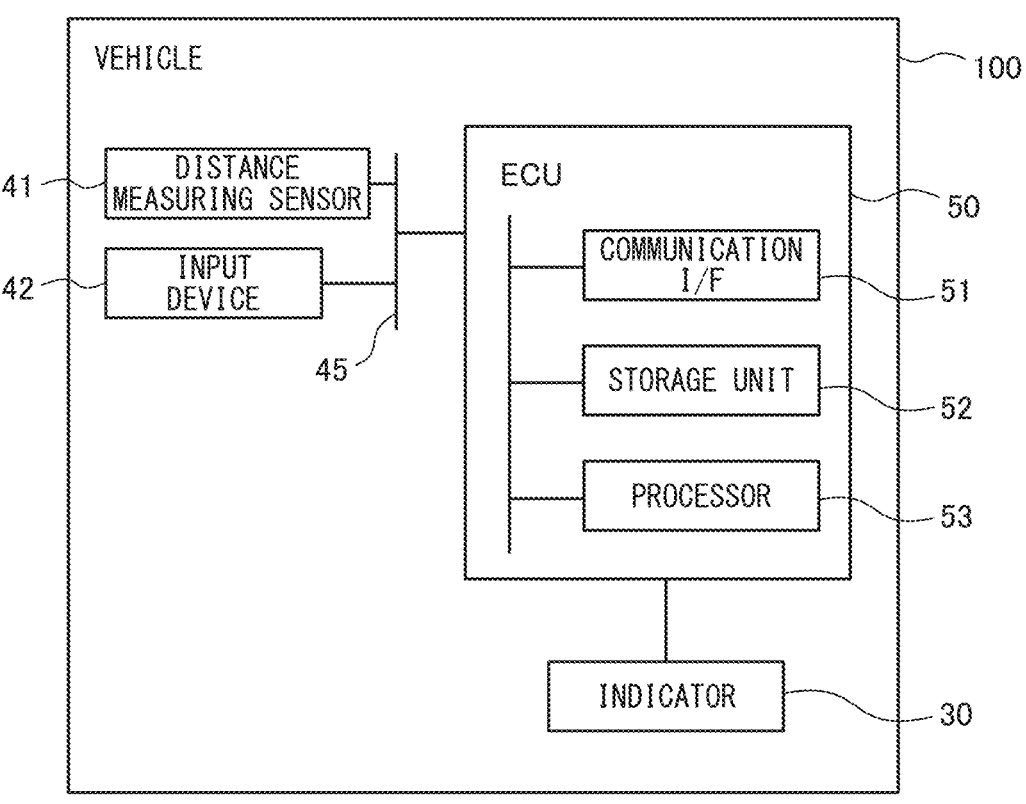
FIG. 6 is a schematic block diagram illustrating an apparatus configuration of the vehicle.

FIG. 6 is a schematic block diagram illustrating an apparatus configuration of the vehicle 100. As illustrated in FIG. 6, in the present embodiment, the vehicle 100 includes, as an apparatus related to the indicator 30, the indicator 30, a distance measuring sensor 41, an input device 42, and the ECU 50. The distance measuring sensor 41, the input device 42, and the ECU 50 are communicably connected to one another via, for example, an intra-vehicle network 45. The intra-vehicle network 45 is, for example, a network conforming to standards of a controller area network (CAN) or the like. The ECU 50 is connected to the indicator 30, particularly, the printed board 32 of the indicator 30 via a signal line. In the present embodiment, the light emission body 34 of the indicator 30 is controlled by the ECU 50.

The distance measuring sensor 41 is an apparatus that measures a distance to an object present around the vehicle 100. Particularly, in the present embodiment, the distance measuring sensor 41 measures a distance to an object present in the rear lateral side of the vehicle 100. The distance measuring sensor 41 is, for example, a radar such as a millimeter wave radar, an LIDAR, or an ultrasonic sensor. As indicated by a broken line in FIG. 1, the distance measuring sensor 41 is disposed in the left rear and the right rear of the vehicle 100 inside a rear bumper of the vehicle 100. The distance measuring sensor 41 outputs a measurement result of a distance to a surrounding object in each predetermined cycle to the ECU 50 via the intra-vehicle network 45.

The input device 42 is a device for a passenger to perform an input operation. The input device includes, for example, a touch panel, a button, or a switch. When a passenger performs an input operation, the input device 42 outputs an operation signal of the input operation to the ECU 50 via the intra-vehicle network 45. Actuation and non-actuation of the indicator 30 can be controlled by the input operation by the input device 42.

The ECU 50 functions as a control device that controls lighting of the indicator 30. As illustrated in FIG. 6, the ECU 50 includes a communication interface 51, a storage unit 52, and a processor 53. The communication interface 51 is a circuit for connecting the ECU 50 to the intra-vehicle network 45. The storage unit 52 stores data. The storage unit 52 includes, for example, at least any one of a volatile semiconductor memory, a non-volatile semiconductor memory, a hard disk drive (HDD), and a solid state drive (SSD). The storage unit 52 stores a computer program executed by the processor 53 of the ECU 50. The processor 53 includes one or a plurality of central processing units (CPUs) and peripheral circuits thereof. The processor 53 may further include another arithmetic circuit such as a logical arithmetic unit or a numerical arithmetic unit. The processor 53 executes a computer program stored in the storage unit 52.

In the present embodiment, the processor 53 controls lighting of the indicator 30. Particularly, in the present embodiment, the processor 53 controls lighting of the indicator 30, based on an output of the distance measuring sensor 41. Specifically, the processor 53 detects whether an object such as another vehicle is present within a predetermined distance from the vehicle 100 in the left rear or the right rear of the vehicle 100, based on an output of the distance measuring sensor 41. Then, when the processor 53 detects that the object is present in the left rear of the vehicle 100, the processor 53 lights the indicator 30 of the door mirror 1 on the left side. When the processor 53 detects that the object is present in the right rear of the vehicle 100, the processor 53 lights the indicator 30 of the door mirror 1 on the right side.

Effect

Next, effects acquired by the indicator 30 according to the present embodiment will be described.

In the present embodiment, the light transmission portion 36 of the indicator 30 is formed of the plurality of linear transmission portions 37. Therefore, the mirror surface portion 13 is located between the linear transmission portions 37 adjacent to each other. Thus, the mirror member 10 according to the present embodiment is provided with the mirror surface portion 13 also in the region where the indicator 30 is provided, i.e., the region where the light transmission portion 36 is provided. Thus, when an object such as another vehicle is present in a position corresponding to the region where the light transmission portion 36 is provided, a passenger (particularly, a driver) of the vehicle 100 can visually recognize the object by reflection by the mirror surface portion 13 located between the linear transmission portions 37 of the light transmission portion 36. As a result, the indicator 30 according to the present embodiment can increase visibility of an object by the door mirror 1.

Further, in the indicator 30 according to the present embodiment, the light transmission portion 36 includes the plurality of linear transmission portions 37 each extending in the horizontal direction and also being aligned in the vertical direction. Hereinafter, effects of including the linear transmission portions 37 formed in such a manner will be described with reference to FIGS. 7 to 11.

Figure 7:
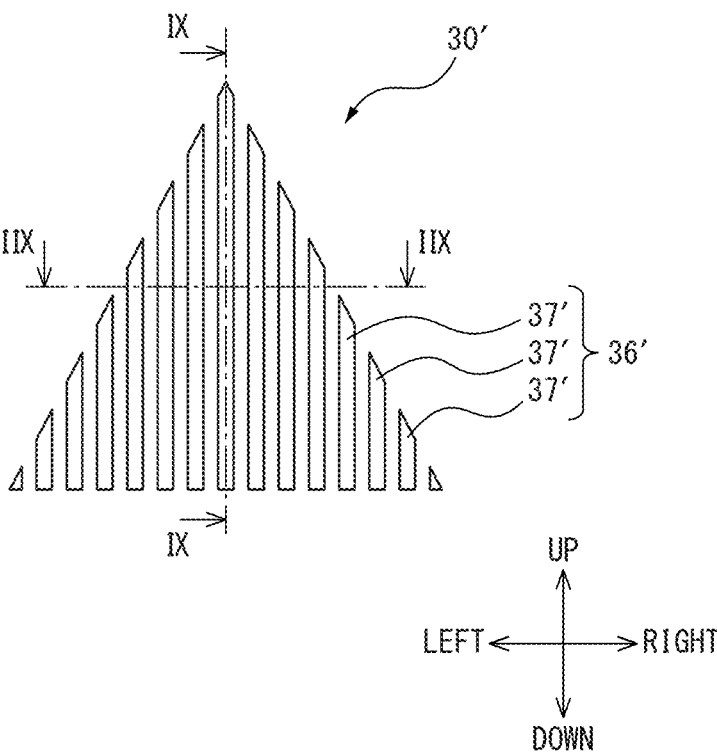
FIG. 7 is a diagram similar to FIG. 4, illustrating an enlarged light transmission portion including linear transmission portions extending in a vertical direction.
Figure 8:
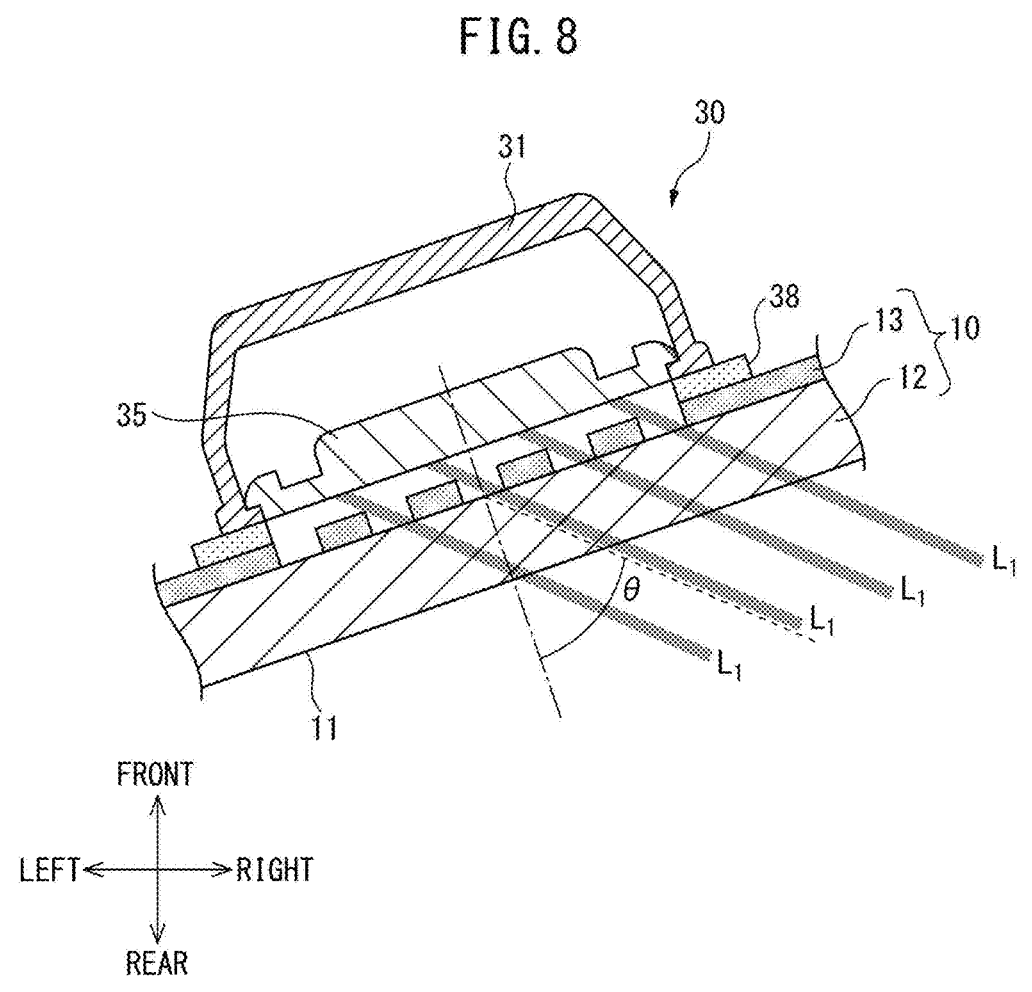
Figure 9:
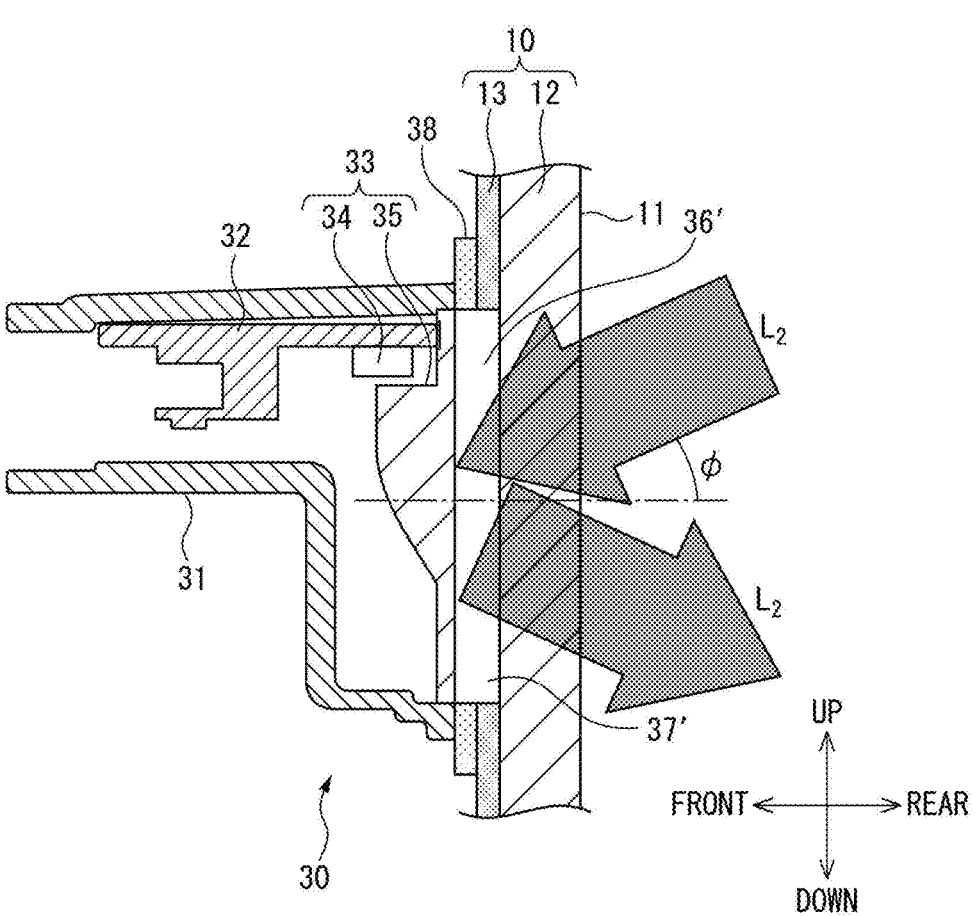
FIG. 9 is a cross-sectional view of the indicator similar to FIG. 5, being viewed along a line IX-IX in FIG. 7.

Herein, an indicator 30' in which a light transmission portion 36' includes a plurality of linear transmission portions 37' each extending in the vertical direction and also being aligned in the horizontal direction is considered. Such a case is illustrated in FIGS. 7 to 9. FIG. 7 is a diagram similar to FIG. 4, illustrating the enlarged light transmission portion 36' including the linear transmission portions 37' extending in the vertical direction. In the example illustrated in FIG. 7, the light transmission portion 36' is formed in such a way that the plurality of linear transmission portions 37' as a whole form one triangle.

FIG. 8 is a cross-sectional view of the indicator 30' viewed along a line IIX-IIX in FIG. 7. In FIG. 8, a situation where a passenger visually recognizes the mirror member 10 from a direction at an angle θ in the horizontal plane with respect to a direction perpendicular to the exposure surface 11 of the mirror member 10 is assumed. As illustrated in FIG. 8, when the passenger visually recognizes the mirror member 10 from the direction at the angle θ, only a part of light $L_1$ transmitted through the light transmission portion 36' of light emitted from the light emission portion 33 (particularly, the lens 35) of the indicator 30' is visually recognized by the passenger. Particularly, when the passenger visually recognizes the mirror member 10 from the direction at the angle θ, as seen from FIG. 8, a lot of light emitted from the light emission portion 33 is blocked in the mirror surface portion 13 by a thickness of the mirror surface portion 13 located between the linear transmission portions 37' adjacent to each other, an apparent light emission area being visually recognized by the passenger is small, and lighting of the indicator 30' is less likely to be visually recognized by the passenger. Particularly, since the light transmission portion 36' of the indicator 30' is formed in the mirror surface portion 13 closer to the outside with respect to the center in the vehicle width direction of the mirror member 10, the angle θ of the passenger with respect to the mirror member 10 is large, and lighting of the indicator 30' is thus less likely to be visually recognized by the passenger. Further, as a size of the vehicle 100 increases, the angle θ of the passenger with respect to the mirror member 10 increases, and lighting of the indicator 30' is thus less likely to be visually recognized by the passenger.

FIG. 9 is a cross-sectional view of the indicator 30' similar to FIG. 5, being viewed along a line IX-IX in FIG. 7. In FIG. 9, a situation where sunlight $L_2$ is incident from a direction at an angle φ in the vertical plane with respect to a direction perpendicular to the exposure surface 11 of the mirror member 10 is assumed. As illustrated in FIG. 9, when the sunlight $L_2$ is incident on the mirror member 10 at any angle $\varphi$ in the vertical direction, all the incident sunlight $L_2$ is transmitted through the mirror member 10, and a part of the sunlight $L_2$ is reflected by the front surface of the lens 35. Then, the light reflected by the front surface of the lens 35 is radiated to the outside via the light transmission portion 36, or reflection by the rear surface or the like of the mirror member 10 and the front surface or the like of the lens 35 is repeated, and then the light is radiated to the outside via the light transmission portion 36. The light not being reflected by the front surface of the lens 35 is also reflected by the inner surface or the like of the housing 31 and is radiated to the outside via the light transmission portion 36. In this case, the lens 35 may be seen to shine by a passenger due to reflection of the sunlight $L_2$, which is thus confused with light emission from the light emission portion 33, and, as a result, lighting of the indicator 30' is less likely to be properly recognized by the passenger. Particularly, when the inner surface of the housing 31 is formed in a mirror surface manner, sunlight incident from the mirror member 10 is reflected by the inner surface of the housing 31, and, as a result, the light is more likely to be confused with light emission from the light emission portion 33.

In contrast, as described above, in the indicator 30 according to the present embodiment, the light transmission portion 36 includes the plurality of linear transmission portions 37 each extending in the horizontal direction and also being aligned in the vertical direction. A situation of light emission and reflection in the indicator 30 according to the present embodiment is illustrated in FIGS. 10 and 11.

Figure 10:
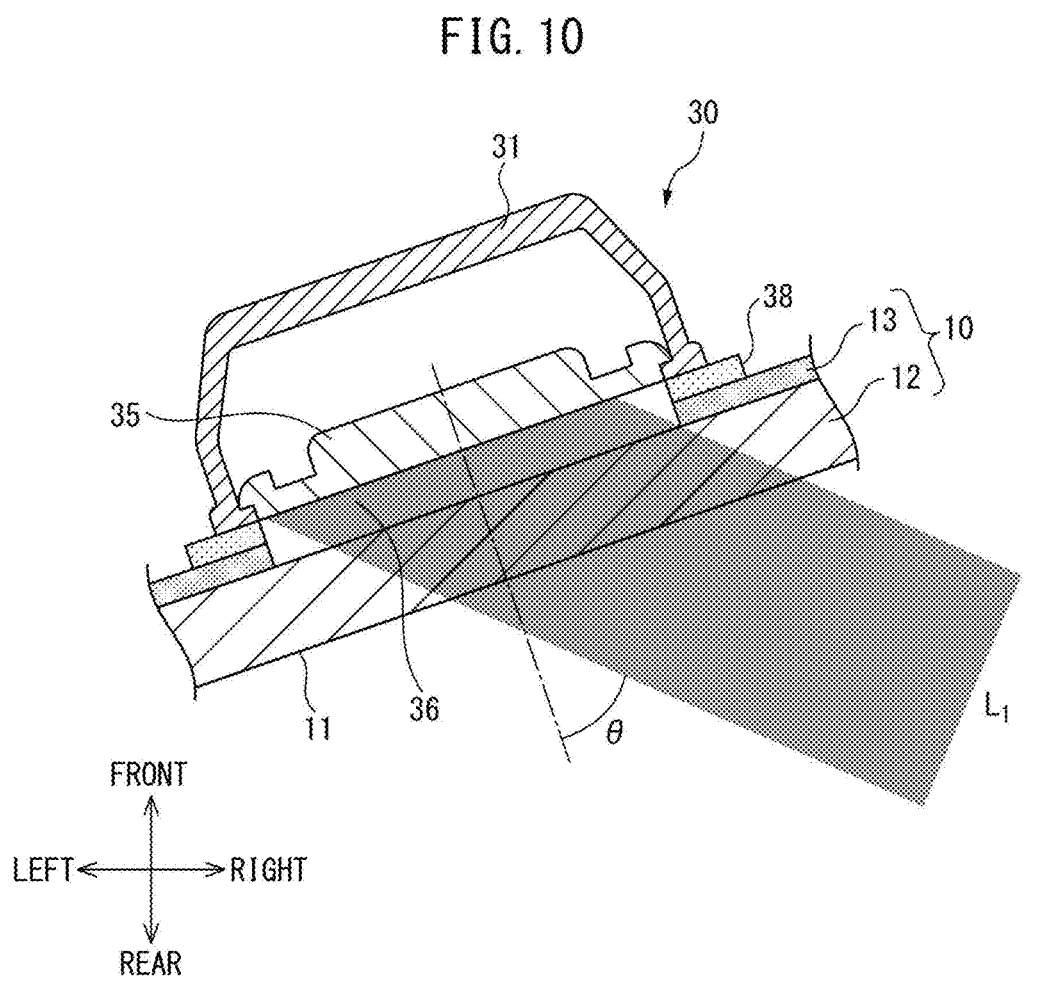

FIG. 10 is a cross-sectional view of the indicator 30 similar to FIG. 8, being viewed along a line X-X in FIG. 4. In FIG. 10, a situation where a passenger visually recognizes the mirror member 10 from a direction at an angle θ in the horizontal plane with respect to a direction perpendicular to the exposure surface 11 of the mirror member 10 is also assumed. As illustrated in FIG. 10, when the passenger visually recognizes the mirror member 10 from the direction at the angle θ, most of light $L_1$ of light emitted from the light emission portion 33 (particularly, the lens 35) of the indicator 30 is visually recognized by the passenger because the linear transmission portions 37 extend in the horizontal direction. Therefore, most of the light emitted from the light emission portion 33 is not blocked by the mirror surface portion 13, and thus an apparent light emission area being visually recognized by the passenger is large, and lighting of the indicator 30 is thus more likely to be visually recognized by the passenger. In addition, since the linear transmission portions 37 extend in the horizontal direction, even when the angle θ of the passenger with respect to the mirror member 10 is increased by the light transmission portion 36 being formed closer to the outside with respect to the center in the vehicle width direction of the mirror member 10, or by a size of the vehicle 100 being larger, most of the light emitted from the light emission portion 33 is not blocked, and lighting of the indicator 30 is thus likely to be visually recognized by the passenger.

Figure 11:
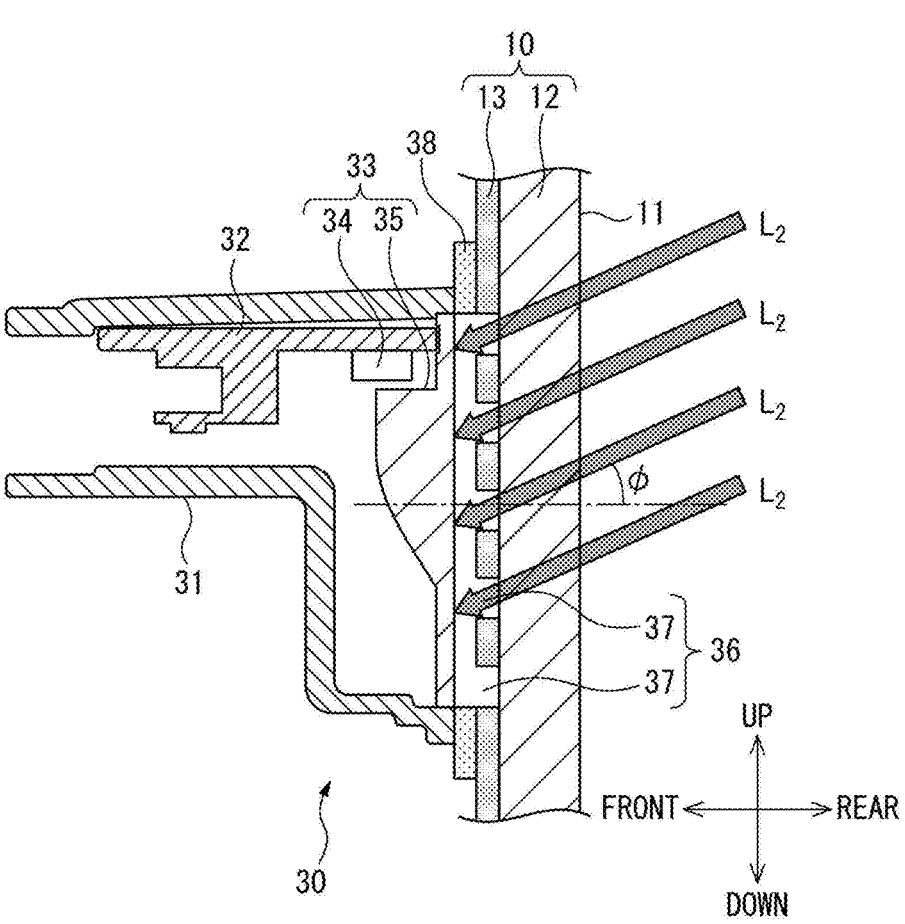
FIG. 11 is a cross-sectional view of the indicator similar to FIG. 5, being viewed along the line V-V in FIG. 4.

FIG. 11 is a cross-sectional view of the indicator 30 similar to FIG. 5, being viewed along the line V-V in FIG. 4. In FIG. 11, a situation where sunlight $L_2$ is incident from a direction at an angle $\varphi$ in the vertical plane with respect to a direction perpendicular to the exposure surface 11 of the mirror member 10 is also assumed. As illustrated in FIG. 11, when the sunlight $L_2$ is incident on the mirror member 10 at any angle $\varphi$ in the vertical direction, a part of the incident sunlight $L_2$ is blocked by the mirror surface portion 13 located between the linear transmission portions 37 adjacent to each other. As a result, the light of the sunlight $L_2$ being transmitted through the mirror member 10 and reaching the front surface of the lens 35 is reduced, and the lens 35 seen to shine by the passenger is suppressed even when the light is reflected by the front surface of the lens 35. In other words, according to the present embodiment, confusion between the sunlight $L_2$ reaching the lens 35 and light emission from the light emission portion 33 is suppressed, and, as a result, lighting of the indicator 30 is properly recognized by the passenger. Particularly, in the present embodiment, the inner surface of the housing 31 is formed in a mirror surface manner, and, even in such a case, the light of the sunlight $L_2$ being transmitted through the mirror member 10 and reaching the front surface of the lens 35 is reduced, and is thus less likely to be confused with light emission from the light emission portion 33.

Modification

Next, modifications of the indicator 30 will be described with reference to FIGS. 12 and 13. In the embodiment described above, the light transmission portion 36 is formed in such a way that the plurality of linear transmission portions 37 as a whole form one triangle. However, the light transmission portion 36 may be formed in such a way as to form another shape instead of a triangle.

Figure 12:
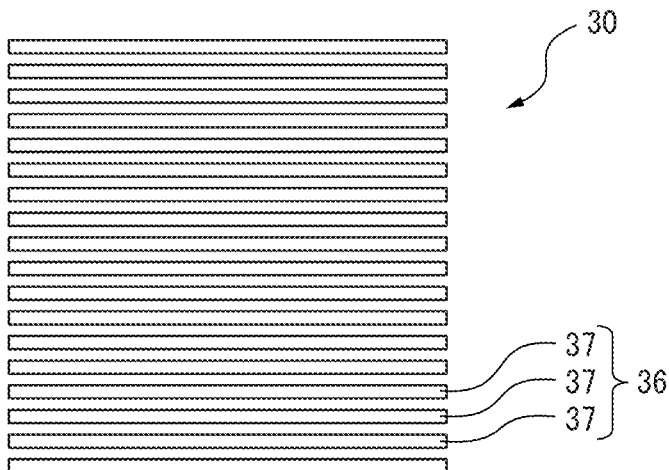
FIG. 12 is a diagram similar to FIG. 4, illustrating the enlarged light transmission portion of the indicator according to one modification.

FIG. 12 is a diagram similar to FIG. 4, illustrating the enlarged light transmission portion 36 of the indicator 30 according to one modification. As illustrated in FIG. 12, also in the present modification, the light transmission portion 36 includes the plurality of linear transmission portions 37 each extending in the horizontal direction and also being aligned in the vertical direction. In the modification illustrated in FIG. 12, the light transmission portion 36 is formed in such a way that the plurality of linear transmission portions 37 as a whole form a quadrilateral (particularly, a square) having a base extending horizontally.

Figure 13:
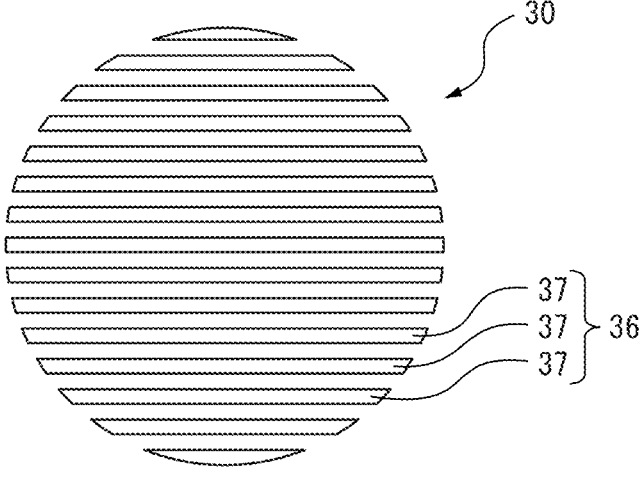
FIG. 13 is a diagram similar to FIG. 4, illustrating the enlarged light transmission portion of the indicator according to another one modification.

FIG. 13 is a diagram similar to FIG. 4, illustrating the enlarged light transmission portion 36 of the indicator 30 according to another one modification. As illustrated in FIG. 13, also in the present modification, the light transmission portion 36 includes the plurality of linear transmission portions 37 each extending in the horizontal direction and also being aligned in the vertical direction. In the modification illustrated in FIG. 13, the light transmission portion 36 is formed in such a way that the plurality of linear transmission portions 37 as a whole form a circle.

In such a manner, the light transmission portion 36 of the indicator 30 is formed in such a way that the plurality of linear transmission portions as a whole form one closed planar figure. In this way, as compared to a case where the light transmission portion 36 is formed in one linear shape, light can be emitted from a certain unified region, which is thus more likely to be visually recognized by a passenger. Note that the light transmission portion 36 may be formed in a shape other than the shapes in the embodiment and the modifications described above, such as a polygon and an ellipse other than a triangle and a quadrilateral. Further, as long as the light transmission portion 36 includes the plurality of linear transmission portions 37 each extending in the horizontal direction and also being aligned in the vertical direction, the light transmission portion 36 as a whole may not be necessarily formed in such a way as to form one closed planar figure.

While the suitable embodiments according to the present disclosure have been described, the present disclosure is not limited to these embodiments, and various modifications and changes can be made within the scope of the claims.

The invention claimed is:

1. An indicator provided on an outer mirror of a vehicle, the indicator comprising:

a light transmission portion formed in a mirror surface portion of a mirror member of the outer mirror; and a light emission portion disposed on a side opposite to an exposure surface side being exposed to the outside of the mirror member, wherein the light emission portion is configured to emit light through the light transmission portion, wherein the light transmission portion includes a plurality of linear transmission portions, each of the plurality of linear transmission portions extending in a horizontal direction with respect to the mirror surface portion of the mirror member when the outer mirror is mounted on the vehicle, and each of the plurality of linear transmission portions also being aligned in a vertical direction with each other with respect to the mirror surface portion of the mirror member when the outer mirror is mounted on the vehicle.

2. The indicator according to claim 1, wherein the plurality of linear transmission portions as a whole form one closed planar figure.

3. The indicator according to claim 2, wherein the the plurality of linear transmission portions as a whole form one triangle.

4. The indicator according to claim 3, wherein the plurality of linear transmission portions as a whole form one triangle having a base extending horizontally.

5. The indicator according to claim 1, wherein the light transmission portion is formed of only the plurality of linear transmission portions.

6. The indicator according to claim 1, wherein the light emission portion includes a light emission body, and a lens disposed between the light emission body and the light transmission portion.

7. The indicator according to claim 6, further comprising a housing disposed around the light emission portion, wherein an inner surface of the housing is formed in a mirror surface manner.

8. An outer mirror comprising the indicator according to claim 1, wherein the light transmission portion is formed in the mirror surface portion closer to the outside with respect to the center in a vehicle width direction of the mirror member.

9. The indicator according to claim 1, further comprising a mirror member including a body and a mirror surface portion on the body, wherein the plurality of linear transmission portions is formed in the mirror surface portion on the body, and the mirror surface portion has portions each located on the body between the linear transmission portions adjacent to each other.

10. The indicator according to claim 1, wherein the linear transmission portions have the same width, and the same interval between the linear transmission portions adjacent to each other.

11. The indicator according to claim 1, wherein the mirror surface portion is formed of a glossy material including chrome, aluminum or silver.

12. The indicator according to claim 9, wherein mirror surface portion is configured to entirely reflect light entering the body of the mirror member.

13. The indicator according to claim 1, wherein mirror surface portion is not in the light transmission portion.

14. The indicator according to claim 9, wherein each of the portions of the mirror surface portion is arranged alternately between a pair of the linear transmission portions adjacent to each other.

15. The indicator according to claim 9, wherein the mirror surface portions are on the side of the body opposite to the exposure surface side being exposed to the outside of the mirror member and facing the light emission portion.

16. A vehicle, comprising:

an indicator provided on an outer mirror of the vehicle; and an electronic control unit (ECU) comprising a processor configured to control lighting of the indicator, the indicator comprising:

a light transmission portion formed in a mirror surface portion of a mirror member of the outer mirror; and a light emission portion disposed on a side opposite to an exposure surface side being exposed to the outside of the mirror member wherein the light emission portion is configured to emit light through the light transmission portion, wherein the light transmission portion includes a plurality of linear transmission portions, each of the plurality of linear transmission portions extending in a horizontal direction with respect to the mirror surface portion of the mirror member when the outer mirror is mounted on the vehicle, and each of the plurality of linear transmission portions also being aligned in a vertical direction with each other with respect to the mirror surface portion of the mirror member when the outer mirror is mounted on the vehicle.

17. The vehicle according to claim 16, wherein upon a detection of an object based on an output of a distance measuring sensor of the vehicle, the processor is configured to light the indicator.

* * * * *